United States Patent
Nemec et al.

(10) Patent No.: US 7,726,432 B2
(45) Date of Patent: Jun. 1, 2010

(54) SEAT ASSEMBLY WITH IGNITION SWITCH AND SWITCH ACTUATOR

(75) Inventors: Ben Nemec, Hillsboro, WI (US); Chad Ruetten, Reedsburg, WI (US); Harold Van Duser, Reedsburg, WI (US)

(73) Assignee: Seats, Inc., Reedsburg, WI (US)

( * ) Notice: Subject to any disclaimer, the term of this patent is extended or adjusted under 35 U.S.C. 154(b) by 348 days.

(21) Appl. No.: 11/770,917

(22) Filed: Jun. 29, 2007

(65) Prior Publication Data

US 2009/0000846 A1     Jan. 1, 2009

(51) Int. Cl.
B60K 28/04     (2006.01)

(52) U.S. Cl. ..................................... 180/273

(58) Field of Classification Search ............... 180/273, 180/271, 272; 200/85 A, 332; 188/109; 340/666
See application file for complete search history.

(56) References Cited

U.S. PATENT DOCUMENTS

| | | | |
|---|---|---|---|
| 3,487,451 A | | 12/1969 | Fontaine |
| 3,569,726 A | * | 3/1971 | Reid et al. ............... 307/10.6 |
| 3,703,618 A | * | 11/1972 | Lewis ....................... 200/85 A |
| 3,704,352 A | * | 11/1972 | Fontaine ................... 200/85 R |
| 3,749,866 A | * | 7/1973 | Tiazkun et al. ........... 200/85 A |
| 3,860,773 A | * | 1/1975 | Fontaine .................. 200/85 A |
| 4,385,863 A | * | 5/1983 | Minor ....................... 414/699 |
| 4,572,319 A | | 2/1986 | Fontaine |
| 4,678,058 A | * | 7/1987 | Wooters .................... 180/273 |
| 4,795,865 A | * | 1/1989 | Howard .................... 200/85 A |
| 5,120,980 A | * | 6/1992 | Fontaine ................... 307/10.1 |
| 5,473,313 A | * | 12/1995 | Graebe, Jr. ............... 340/626 |
| 6,152,534 A | * | 11/2000 | Maeda et al. .......... 297/452.56 |
| 6,361,117 B1 | * | 3/2002 | Tate ...................... 297/452.56 |
| 6,729,691 B2 | * | 5/2004 | Koepke et al. ........ 297/452.56 |
| 7,162,344 B2 | * | 1/2007 | Kojima et al. ............. 701/45 |
| 7,396,077 B2 | * | 7/2008 | Boulva .................... 297/284.2 |
| 2007/0125587 A1 | * | 6/2007 | Tate et al. .................. 180/272 |

OTHER PUBLICATIONS

Cherry Corporation, Webpage, Miniature Snap-Action Switches, http://www.cherrycorp.com/english/switches/miniature/index.htm, publicly available prior to Dec. 2, 2004.

(Continued)

*Primary Examiner*—Paul N Dickson
*Assistant Examiner*—Jordan Golomb
(74) *Attorney, Agent, or Firm*—Michael Best & Friedrich LLP

(57) ABSTRACT

A seat includes a seat frame and a resilient web supported by the seat frame. The web is adapted for movement between an at rest condition in which no operator is seated on the seat, and a deflected condition in which the web is deflected with respect to the frame in response to an operator seated on the seat. A switch actuator is mounted to the web and is movable between a non-actuating position when the web is in the at rest condition and an actuating position when the web is in the deflected condition. A switch is mounted to the frame, the switch includes first and second parts movable with respect to each other to open and close an electrical circuit in response to the switch actuator moving between the non-actuating and actuating positions.

16 Claims, 7 Drawing Sheets

OTHER PUBLICATIONS

Cherry Corporation, Webpage, E Series Miniature Snap-Action Switches, http://www.cherrycorp.com/english/switches/miniature/e21.htm, publicly available prior to Dec. 2, 2004.

Cherry Corporation, Webpage, Miniature E Series, http://www.cherrycorp.com/english/switches/miniature/pdf/E21_Series.pdf, publicly available prior to Dec. 2, 2004.

* cited by examiner

SEAT ASSEMBLY WITH IGNITION SWITCH AND SWITCH ACTUATOR

BACKGROUND

The present invention relates to a seat assembly that includes an ignition switch and an actuator for actuating the switch.

SUMMARY

In one embodiment, the invention provides a seat comprising: a seat frame; a resilient web supported by the seat frame, the web adapted for movement between an at rest condition in which no operator is seated on the seat, and a deflected condition in which the web is deflected with respect to the frame in response to an operator seated on the seat; a switch actuator mounted to the web and movable between a non-actuating position when the web is in the at rest condition and an actuating position when the web is in the deflected condition; and a switch mounted to the frame, the switch having first and second parts movable with respect to each other to open and close an electrical circuit in response to the switch actuator moving between the non-actuating and actuating positions.

In some embodiments, the switch is adapted for use with an ignition system of an off-highway vehicle, and the switch disables the ignition system in response to the switch actuator moving into the non-actuating position. In other embodiments, the seat includes fasteners connecting the actuator plate to the resilient web, which fasteners may in some embodiments extend through the resilient web. In some embodiments, the first part of the switch is mounted to the frame and the switch actuator applies a force to the second part of the switch in response to the switch actuator moving into the actuating position, the force applied to the second part of the switch moving the second part with respect to the first part. In other embodiments, the switch includes a biasing member biasing the first and second parts away from each other, and the switch actuator applies a compressive force to the biasing member through the second part of the switch in response to the switch actuator moving into the actuating position, such that the biasing member deflects to permit the second part of the switch to move with respect to the first part of the switch.

In some embodiments, the seat includes a front portion proximate the legs of a person sitting in the seat, a rear portion opposite the front portion, and left and right side portions between the front and rear portions on opposite sides of the seat; the web is mounted to the frame at the right and left side portions of the seat; the switch actuator includes an elongated rigid member having proximal and distal ends, the proximal end mounted to the web in the rear portion of the seat and the switch actuator extending along the web in cantilever fashion to position the distal end in the front portion of the seat; and the switch is mounted to the frame in the front portion of the seat beneath the distal end of the switch actuator, such that the distal end engages the switch when the switch actuator is in the actuating position in response to an operator sitting on substantially any portion of the seat.

In some embodiments, the switch actuator is spaced about five-eighths of an inch from the switch when the switch actuator is in the non-actuating position. In other embodiments, the seat frame is constructed of members having a frame thickness; and the height of the switch is about equal to the frame thickness such that substantially the entire switch is positioned within the height of the frame. The actuator may include an indentation, a portion of which applies a force against at least one of the first and second parts of the switch in response to the actuator moving into the actuating position to cause relative movement between the first and second parts. The indentation may be configured to apply the force against at least one of the first and second parts of the switch over a full range of deflection angles of the actuator.

In another embodiment of the invention, an off-highway vehicle comprises a chassis; a wheel supporting the chassis; a prime mover mounted to the chassis; a transmission for driving the wheel in response to the operation of the prime mover; a seat frame; a resilient web supported by the seat frame, the web adapted for movement between an at rest condition in which no operator is seated on the seat, and a deflected condition in which the web is deflected with respect to the frame in response to an operator seated on the seat; a switch actuator mounted to the web and movable between a non-actuating position when the web is in the at rest condition and an actuating position when the web is in the deflected condition; and a switch mounted to the frame, the switch having first and second parts movable with respect to each other to open and close an electrical circuit to enable and disable operation of the prime mover, in response to the switch actuator moving between the non-actuating and actuating positions. The prime mover may be in some embodiments an internal combustion engine. Such an off-highway vehicle may include other elements described above. The switch actuator may include an indentation, a portion of which applies a force against at least one of the first and second parts of the switch in response to the actuator moving into the actuating position to cause relative movement between the first and second parts. The indentation may be configured to apply the force against at least one of the first and second parts of the switch over a full range of deflection angles of the actuator.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
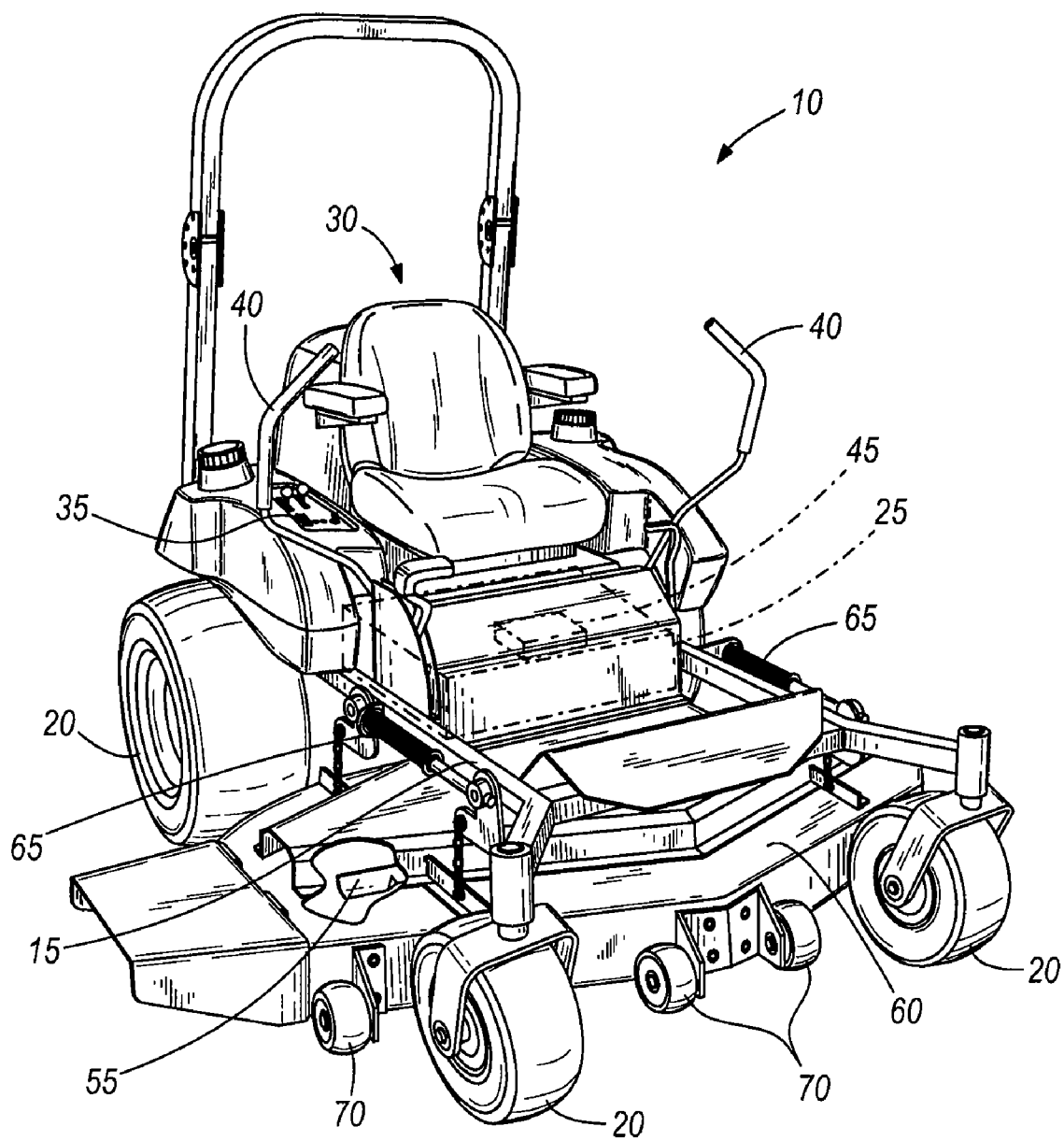
FIG. 1 is a perspective view of an off-highway vehicle including a seat assembly according to the present invention.

FIG. 1 illustrates an off-highway vehicle 10 that includes a chassis 15, wheels 20 supporting the chassis 15, an internal combustion engine 25 mounted to the chassis 15, and a seat 30 mounted to the chassis 15. An operator zone of the vehicle 10 includes the seat 30, a control panel 35 within reach of an operator seated in the seat 30, and control levers 40 within reach of an operator seated in the seat 30. The illustrated off-highway vehicle 10 is commonly referred to as a zero-turn radius lawn mower, but the invention may be embodied in other types of off-highway vehicles and other vehicles intended for road use; the invention is not limited to the application illustrated.

In the illustrated embodiment, the engine 25 includes an ignition system 45 that provides a spark or other event that drives combustion within the internal combustion engine 25. Although the engine 25 in the illustrated embodiment is of the internal combustion variety, the invention is applicable to any type of engine, and the term "ignition system," as applied to this invention, refers to the part of the engine that sustains its continued operation. In this regard, the ignition system 45 may be termed an ignition circuit that permits operation of the engine 25 when closed and disables operation of the engine 25 when open. Although the illustrated embodiment includes an internal combustion engine 25, the present invention may be applied to vehicles and systems having alternative prime movers, such as batteries or other energy storage devices, fuel cells, or gas/electric hybrid drive systems. In such other embodiments, the ignition system would include the electric circuit that enables and disables the prime mover to operate or that enables and disables the vehicle drive and implement systems to operate under the influence of the prime mover.

In the illustrated embodiment, the engine 25 drives rotation of at least one of the wheels 20 through a transmission (e.g., a hydraulic, electric, or mechanical transmission). The operator independently controls speed and direction of rotation of the left and right side wheels 20 via the control levers 40. The engine 25 also selectively drives rotation of one or more cutting blades 55 under a mower deck 60 to cut vegetation over which the vehicle 10 travels. The mower deck 60 is raised and lowered with respect to the chassis by operation of deck actuators 65 which may be controlled by switches on the control panel 35. The mower deck 60 may include wheels 70 or other mechanisms to facilitate the deck 60 moving smoothly over ground to maintain an even cutting height for the blades 55.

Figure 2:
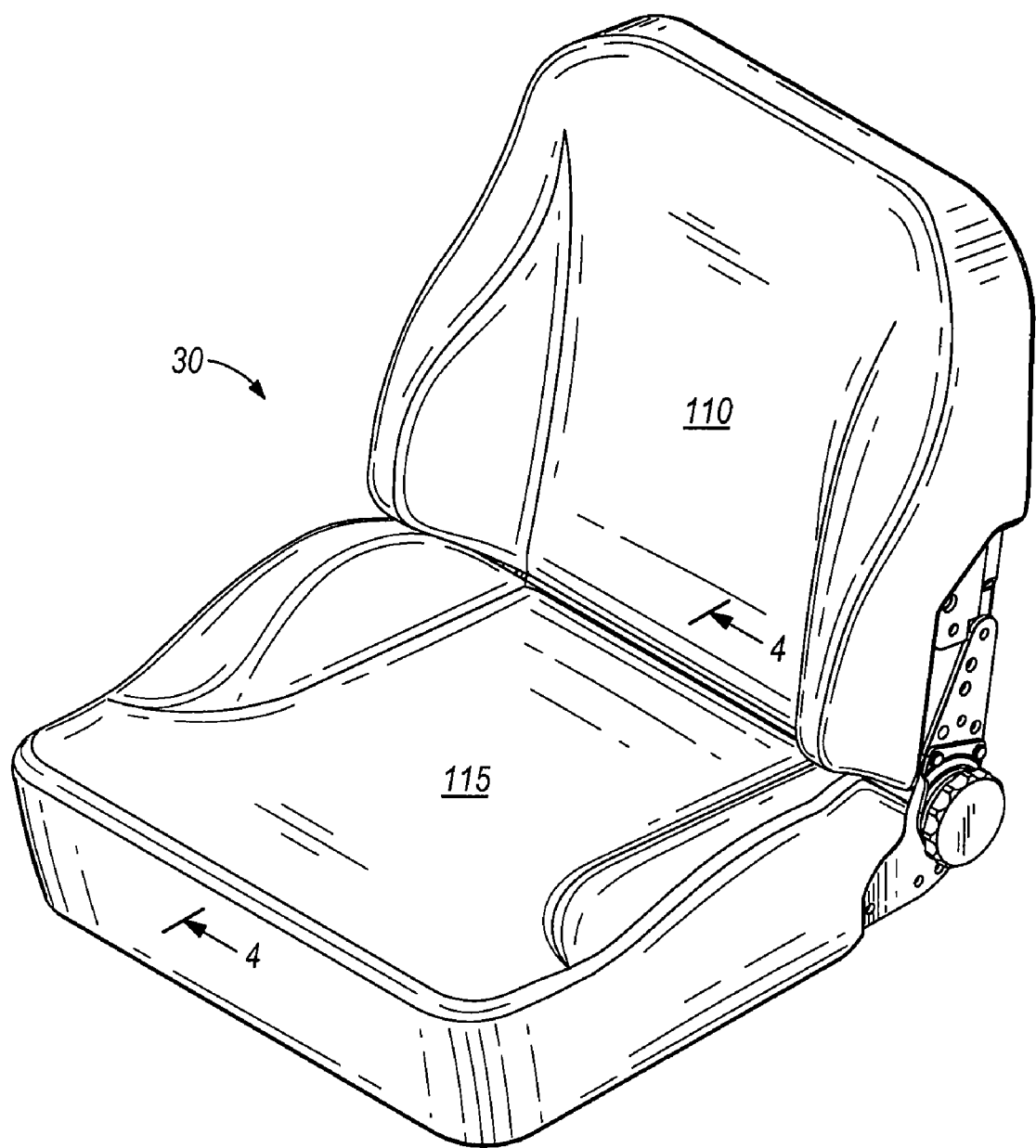
FIG. 2 is a perspective view of the seat assembly.
Figure 3:
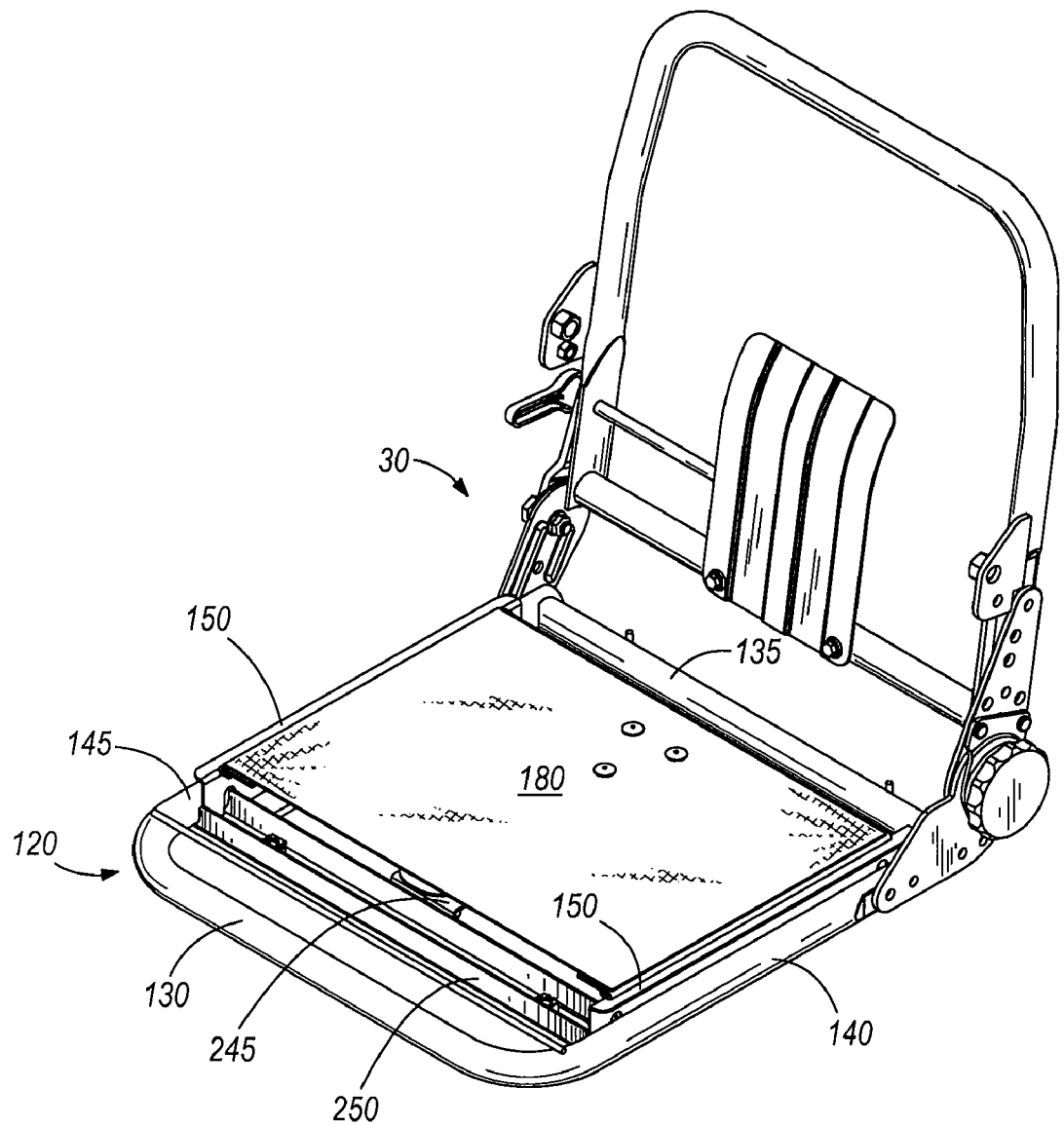
FIG. 3 is a perspective view of the seat assembly with cushions removed.

With reference to FIGS. 2 and 3, the seat 30 includes back and bottom cushions 110, 115, respectively, to accommodate an operator of the vehicle 10. The seat 30 includes a seat frame 120 that includes front and rear portions 130, 135, respectively, and left and right side portions 140, 145, respectively, extending between the front and rear portions 130 and 135. The terms "front," "rear," "left," and "right" refer to the perspective of an operator seated in the seat 30 for normal use. A "front portion" of the seat 30 is that portion proximate the legs of an operator seated in the seat 30. The "front portion" is closer to the front portion 130 of the frame 120 than to the rear portion 135, and a "rear portion" of the seat 30 is that portion closer to the rear portion 135 of the frame 120 than to the front portion 130.

The side portions 140, 145 include support brackets 150 to which are mounted a resilient web 180, such that the web 180 extends across the seat frame 120 between the left and right side portions 140, 145. The illustrated web 180 is made of a flexible, strong, resilient material. One suitable material for use in the web 180 is sold under the Dymetrol trademark of E. I. Du Pont De Nemours and Company. A top surface of the web 180 supports the bottom cushion 115 of the seat 30, and a bottom surface of the web 180 faces down away from the cushion 115.

Figure 4:
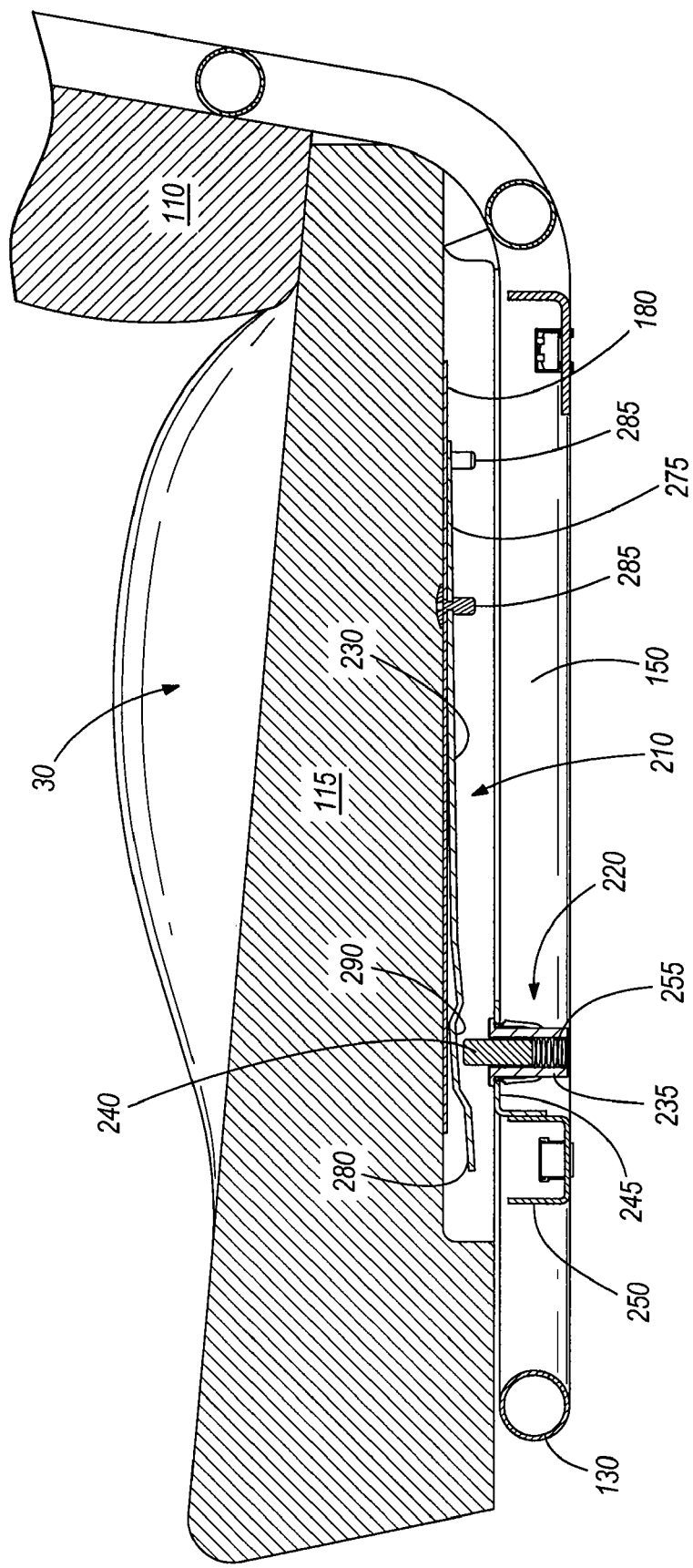
FIG. 4 is a cross-section view taken along line 4-4 in FIG. 3 showing the seat in an at-rest condition.

FIG. 4 illustrates the seat 30 in an at rest condition in which no operator is seated upon the seat 30 and the web 180 is in an at-rest or undeflected condition. A seat switch assembly 210 includes a switch 220 and a switch actuator 230. The switch 220 includes a first part, body, or housing 235 and a second part or plunger 240 that are movable with respect to each other. The illustrated switch 220 includes first and second parts 235, 240 in telescoping relationship, with the second part movable into and out of the first part 235. The switch body 235 is rigidly mounted to a bracket 245 that is mounted to a cross-member 250 that is mounted to the left and right side portions 140, 150 of frame 120 (see also FIG. 3). In other embodiments, the switch body 235 may be mounted directly to the frame 120. The bracket 245 and switch 220 are centered between the left and right side portions 140, 150 of the frame 120. The plunger 240 that is biased by a biasing mechanism 255 (e.g., a spring) into the extended position illustrated in FIG. 4.

One suitable switch 220 is commercially available from Delta Systems, Inc., model number 6440-04, and referred to by the manufacturer as a "1-pole Low Profile Snap Mount Momentary Plunger Switch Series." The switch body 235 may have a height of about one inch, which may in some embodiments be about equal to the diameter of the tubes that define the frame 120. The switch 220 may in such embodiments be regarded as low profile because it can fit within the height of the frame 120.

In the at rest position (illustrated in FIG. 4), the spring 255 biases the plunger 240 to protrude beyond the upper surface of the switch body 235, and the switch 220 opens the circuit in which the switch is incorporated. When the plunger 240 is depressed and held (i.e., in response to an operator sitting on the seat 30), the switch 220 closes the circuit in which it is incorporated. In the illustrated embodiment, the switch 220 is integrated into the engine's ignition system 45. The plunger 240 must be depressed to close the ignition circuit 45 and enable the engine 25 to operate. If the plunger 240 is released and returns to its at rest position, the ignition circuit 45 is opened and the engine 25 will not run. It should also be noted that wireless control systems can be substituted for the hardwired circuit illustrated. In such wireless control systems, the switch 220 would enable or disable a wireless signal generator to control the ignition system 45.

The switch actuator 230 includes a proximal end 275 and a distal end 280. The proximal end 275 is mounted to the bottom surface of the resilient web 180 in the rear portion of the seat assembly 30 with fasteners 285. The fasteners 285 extend through aligned holes in the proximal end 275 of the actuator 230 and the web 180. While the illustrated fasteners 285 are rivets, other means for fastening the switch actuator to the resilient web 180 may be used, such as threaded mechanical fasteners, clips, hooks, or adhesives. The switch actuator 230 is centered between the left and right side portions 140, 150 of the frame 120 and extends in cantilever fashion along the bottom surface of the web 180, with the proximal end 275 roughly under the tailbone of an operator sitting in the rear portion of the seat 30, and the distal end 280 in the front portion of the seat 30. The distal end 280 includes an actuator indentation 290 which is positioned over the switch 220.

When the seat 30 is in the at rest condition illustrated in FIG. 4, the switch actuator 230 is in a non-actuating position, and when the web 180 is in a deflected condition (i.e., in response to an operator sitting on the seat 30) the switch actuator is in an actuating position. While the actuator 230 is in the non-actuating position, the distal end 280 of the switch actuator 230 is over the plunger 240 of the switch 220. The switch actuator 230 may be spaced from the plunger 240 or contact the plunger 240, provided there is insufficient force applied to the plunger 240 to actuate the switch 220 due to the switch actuator 230 resting on the plunger 240. In the illustrated embodiment, the actuator indentation 290 provides a space of about five-eighths (⅝) of an inch between the actuator 230 and the switch 220 when the actuator is in the non-actuating position.

Figure 5:
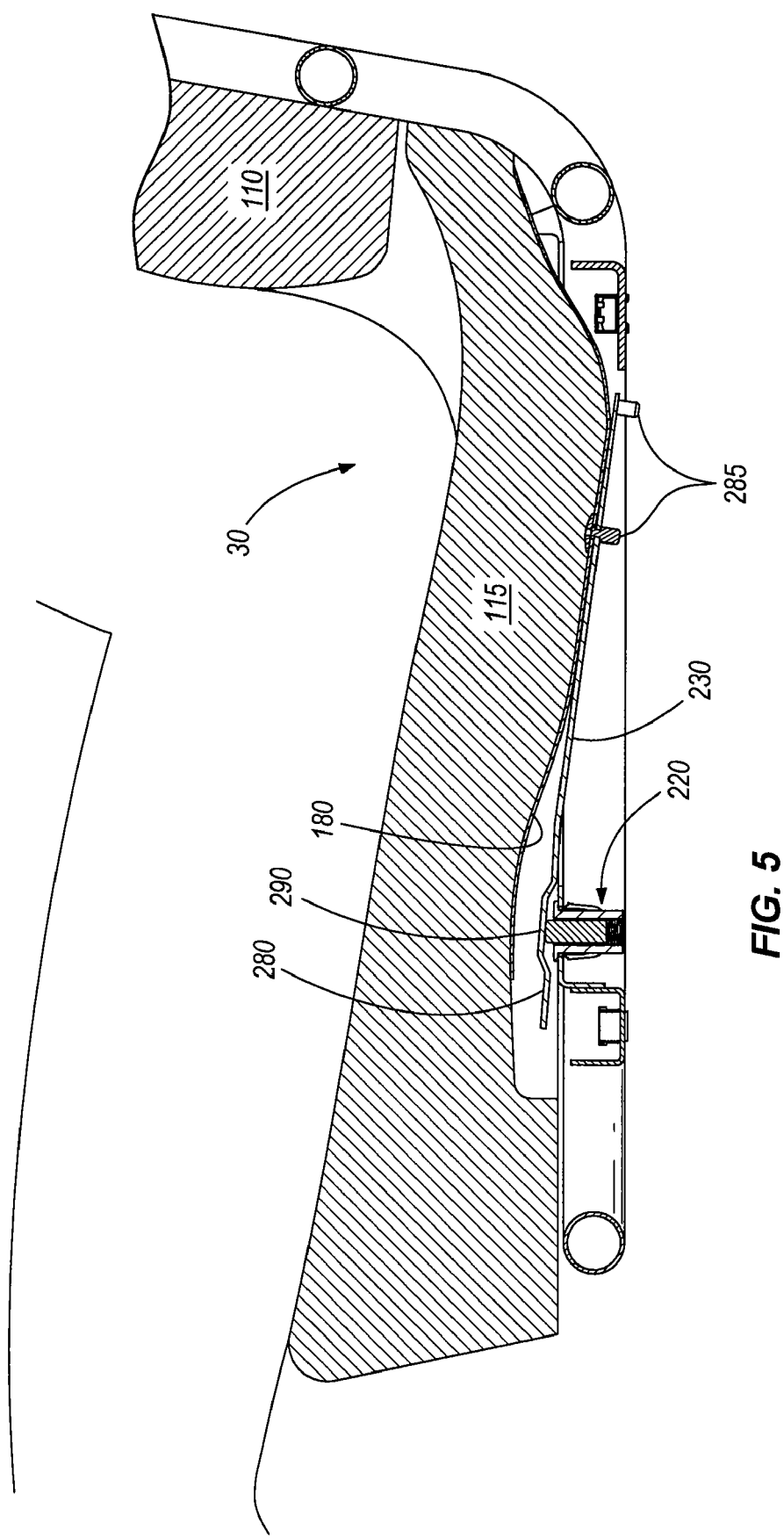
FIG. 5 is the same view as FIG. 4 but showing the seat in a bottomed-out deflected condition.
Figure 6:
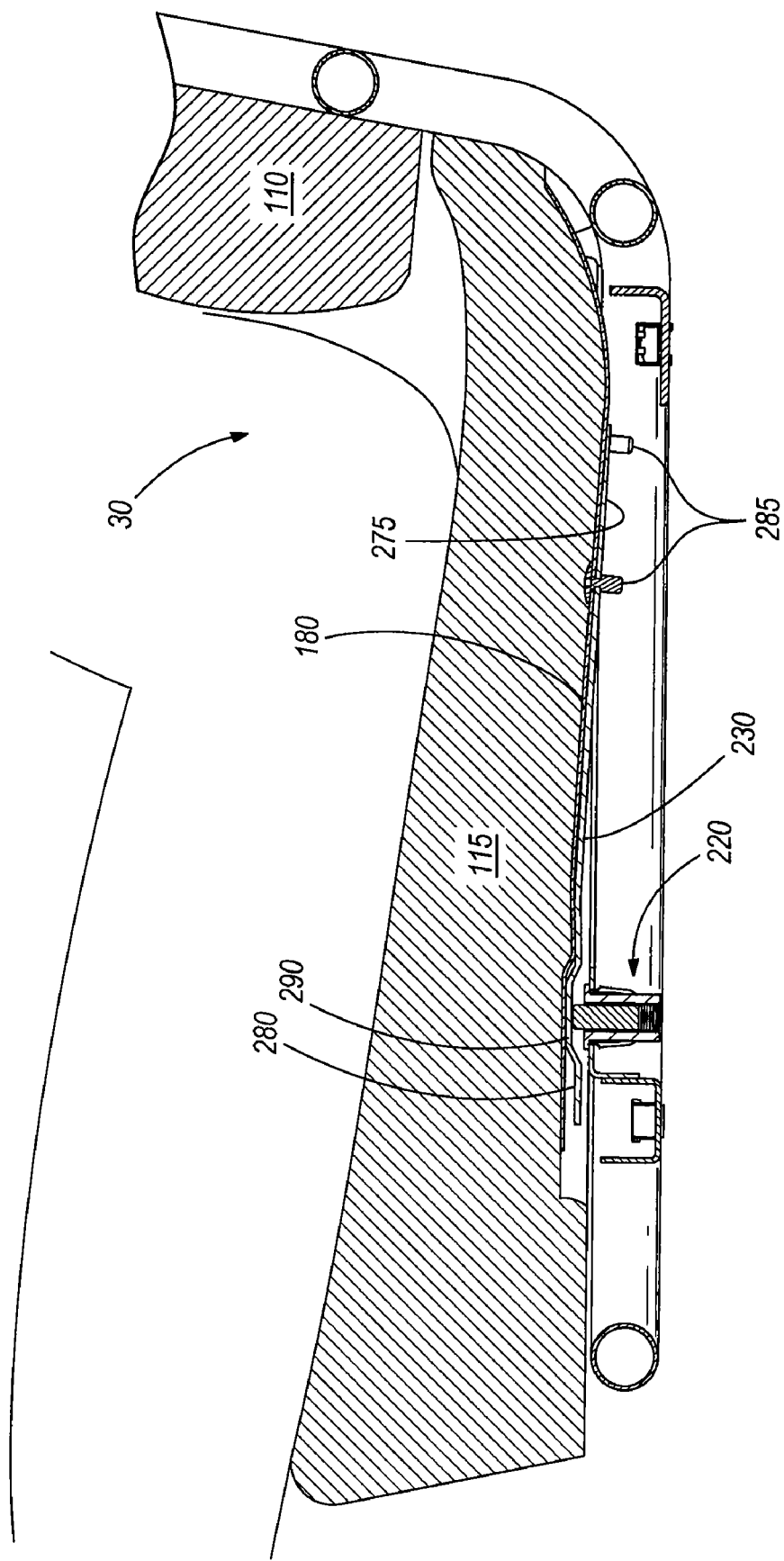
FIG. 6 is the same view as FIGS. 4 and 5, but showing the seat in a deflected condition corresponding to a lighter weight operator sitting on a rear portion of the seat.
Figure 7:
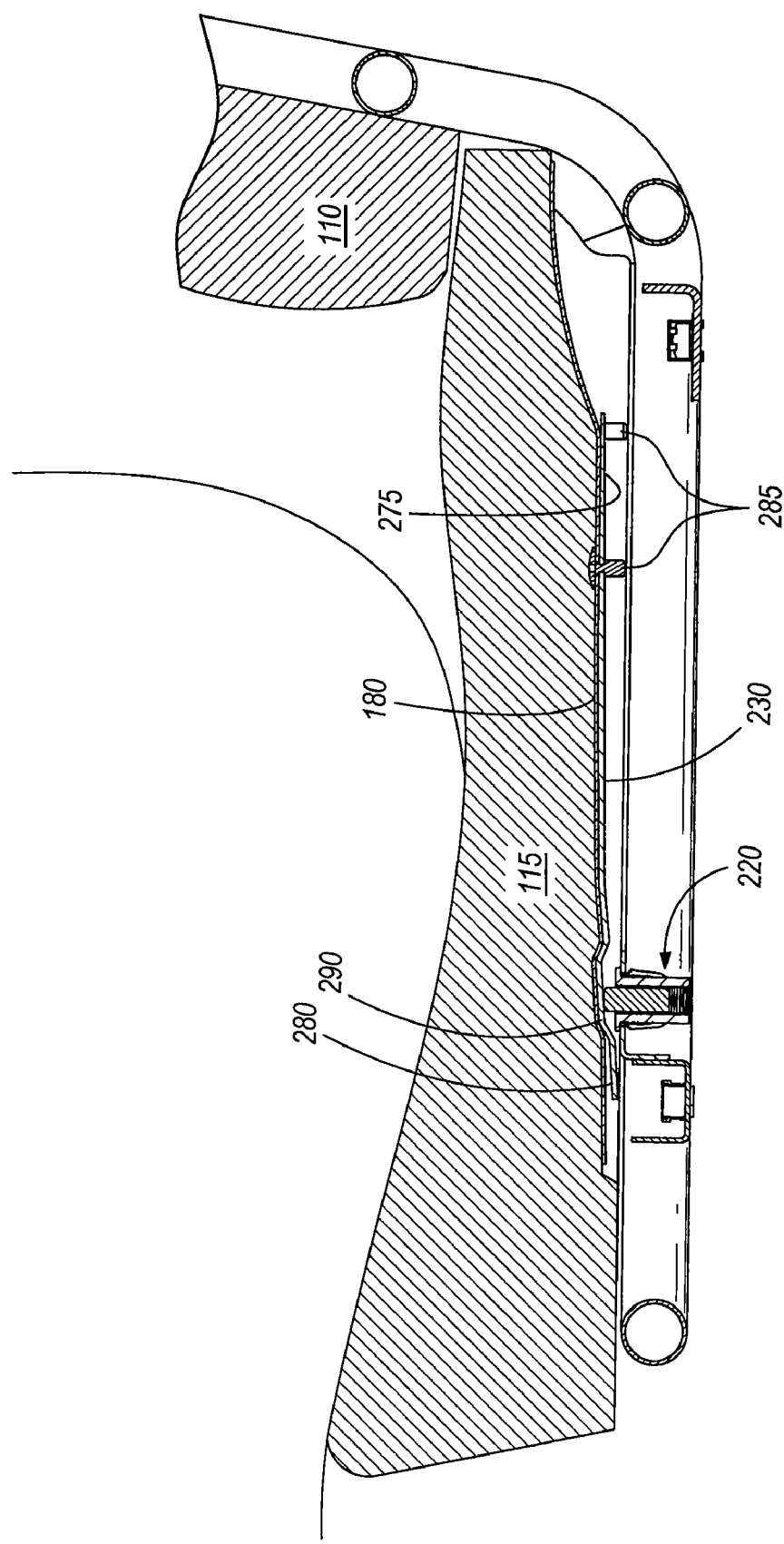
FIG. 7 is the same view as FIGS. 4-6, but showing the seat in a deflected condition corresponding to a lighter weight operator sitting on a front portion of the seat.

FIGS. 5, 6, and 7 illustrate additional cross sectional views of the seat 30, each showing the presence of an operator upon the seat. FIG. 5 shows the position of the seat components in response to the presence of a heavy operator seated upon the rear portion of the seat 30, and bottoming the seat out. FIG. 6 shows the position of the seat components in response to the presence of a comparatively lighter operator seated upon the rear portion of the seat 30. FIG. 7 shows the position of the seat components in response to the lighter operator seated upon the front portion of the seat 30.

The web 180 deflects in response to an operator sitting upon the seat 30, and in this regard FIGS. 5, 6 and 7 all illustrate positions of the resilient web 180 that may be termed a deflected condition. The switch actuator 230 moves from the non-actuating position to the actuating position in response to the deflection of the resilient web 180. In this regard, FIGS. 5, 6, and 7 illustrate actuating positions of the switch actuator 230. In the actuating positions, the distal end 280 of the switch actuator 230 may separate from contact with the bottom surface of the web 180 (e.g., when a heavier operator sits on the rear portion of the seat 30 as in FIG. 5) and cantilever over the switch 220. The actuator indentation 290 ensures that the switch actuator 230 applies a downward force on the plunger 240, which may also be called a compressive force on the switch 220, when the actuator 230 moves into the actuated position. The depth of the actuator indentation 290 may be adjusted to modify the sensitivity of the switch assembly 210, and also to prevent the plunger 240 from bottoming out within the housing 235. Movement of the switch actuator 230 into any of the actuated positions (i.e., over the full range of deflection angles that may be imposed on the actuator 230 in response to operators of a wide variety of weights sitting in various positions on the seat 30) causes the plunger 240 to deflect into the housing 235, which closes the ignition circuit 45 and enables the engine 25 to function.

When an operator gets out of the seat 30, the resilient web 180 returns to the at rest condition, which moves the actuator 230 to the non-actuating position and permits the biasing member 255 in the switch 220 to move the plunger 240 into the at-rest unactuated position, which in turn opens the ignition circuit 45. In other embodiments, the switch may be flipped around so that the plunger 240 is fixed with respect to the frame 120 and the housing 235 is engaged by the actuator 230.

Although the illustrated embodiment described above contemplates use of a normally open switch, it could in other embodiments include a normally closed switch that connects the ignition circuit 45 to a grounding circuit when the switch actuator 230 moves to the non-actuated position. Although the illustrated embodiment described above controls an ignition circuit 45, other embodiments may apply the invention to other types of circuits, including but not limited to airbag deployment, transmission interlocks, and implement power take off circuits.

Thus, the invention provides, among other things, a seat switch assembly mounted to a frame and resilient web of a seat assembly. Various features and advantages of the invention are set forth in the following claims.

What is claimed is:

1. A seat comprising:
   a seat frame;
   a resilient web supported by the seat frame, the web adapted for movement between an at rest condition in which no operator is seated on the seat, and a deflected condition in which the web is deflected with respect to the frame in response to an operator seated on the seat;
   a switch actuator mounted to the web and movable between a non-actuating position when the web is in the at rest condition and an actuating position when the web is in the deflected condition; and
   a switch mounted to the frame, the switch having first and second parts movable with respect to each other to open and close an electrical circuit in response to the switch actuator moving between the non-actuating and actuating positions, wherein the seat includes a front portion proximate the legs of a person sitting in the seat, a rear portion opposite the front portion, and left and right side portions between the front and rear portions on opposite sides of the seat; wherein the web is mounted to the frame at the right and left side portions of the seat; wherein the switch actuator includes an elongated rigid member having proximal and distal ends, the proximal end mounted to the web in the rear portion of the seat and the switch actuator extending along the web in cantilever fashion to position the distal end in the front portion of the seat; and wherein the switch is mounted to the frame in the front portion of the seat beneath the distal end of the switch actuator, such that the distal end engages the switch when the switch actuator is in the actuating position in response to an operator sitting on substantially any portion of the seat.

2. The seat of claim 1, wherein the switch is adapted for use with an ignition system of an off-highway vehicle, and the switch disables the ignition system in response to the switch actuator moving into the non-actuating position.

3. The seat of claim 1, further comprising an actuator plate and fasteners connecting the actuator plate to the resilient web.

4. The seat of claim 3, wherein the fasteners extend through the resilient web.

5. The seat of claim 1, wherein the first part of the switch is mounted to the frame and wherein the switch actuator applies a force to the second part of the switch in response to the switch actuator moving into the actuating position, the force applied to the second part of the switch moving the second part with respect to the first part.

6. The seat of claim 5, wherein the switch includes a biasing member biasing the first and second parts away from each other, and wherein the switch actuator applies a compressive force to the biasing member through the second part of the switch in response to the switch actuator moving into the actuating position, such that the biasing member deflects to permit the second part of the switch to move with respect to the first part of the switch.

7. The seat of claim 1, wherein the seat frame is constructed of members having a frame thickness; and wherein the height of the switch is about equal to the frame thickness such that substantially the entire switch is positioned within the height of the frame.

8. The seat of claim 1, wherein the actuator includes an indentation and wherein a portion of the indentation applies a force against at least one of the first and second parts of the switch in response to the actuator moving into the actuating position to cause relative movement between the first and second parts.

9. The seat of claim 8, wherein the indentation is configured to apply the force against at least one of the first and second parts of the switch over a full range of deflection angles of the actuator.

10. An off-highway vehicle comprising:
a chassis;
a wheel supporting the chassis;
a prime mover mounted to the chassis;
a transmission for driving the wheel in response to the operation of the prime mover;
a seat frame;
a resilient web supported by the seat frame, the web adapted for movement between an at rest condition in which no operator is seated on the seat, and a deflected condition in which the web is deflected with respect to the frame in response to an operator seated on the seat;
a switch actuator mounted to the web and movable between a non-actuating position when the web is in the at rest condition and an actuating position when the web is in the deflected condition; and
a switch mounted to the frame, the switch having first and second parts movable with respect to each other to open and close an electrical circuit to enable and disable operation of the prime mover, in response to the switch actuator moving between the non-actuating and actuating positions, wherein the first part of the switch is mounted to the frame and wherein the switch actuator applies a force to the second part of the switch in response to the switch actuator moving into the actuating position, the force applied to the second part of the switch moving the second part with respect to the first part; wherein the switch includes a biasing member biasing the first and second parts away from each other, and wherein the switch actuator applies a compressive force to the biasing member through the second part of the switch in response to the switch actuator moving into the actuating position, such that the biasing member deflects to permit the second part of the switch to move with respect to the first part of the switch, wherein the seat includes a front portion proximate the legs of a person sitting in the seat, a rear portion opposite the front portion, and left and right side portions between the front and rear portions on opposite sides of the seat; wherein the web is mounted to the frame at the right and left side portions of the seat; wherein the switch actuator includes an elongated rigid member having proximal and distal ends, the proximal end being mounted to the web in the rear portion of the seat and the switch actuator extending along the web in cantilever fashion to position the distal end in the front portion of the web; and wherein the switch is mounted to the frame in the front portion of the seat beneath the distal end of the switch actuator, such that the distal end engages the switch when the switch actuator is in the actuating position in response to an operator sitting on substantially any portion of the seat.

11. The off-highway vehicle of claim 10, wherein the prime mover includes an internal combustion member; wherein the electrical circuit includes an ignition circuit enabling operation of the engine when closed and disabling operation of the engine when open; and wherein the switch opens the ignition circuit in response to the switch actuator moving into the non-actuating position and closes the ignition circuit in response to the switch actuator moving into the actuating position.

12. The off-highway vehicle of claim 10, further comprising fasteners connecting the actuator plate to the resilient web.

13. The off-highway vehicle of claim 12, wherein the fasteners extend through the resilient web.

14. The off-highway vehicle of claim 10, wherein the seat frame is constructed of members having a frame thickness; and wherein the height of the switch is about equal to the frame thickness such that substantially the entire switch is positioned within the height of the frame.

15. The off-highway vehicle of claim 10, wherein the switch actuator includes an indentation and wherein a portion of the indentation applies a force against at least one of the first and second parts of the switch in response to the actuator moving into the actuating position to cause relative movement between the first and second parts.

16. The off-highway vehicle of claim 15, wherein the indentation is configured to apply the force against at least one of the first and second parts of the switch over a full range of deflection angles of the actuator.

* * * * *